US011141938B2

(12) United States Patent
Lanfant et al.

(10) Patent No.: US 11,141,938 B2
(45) Date of Patent: Oct. 12, 2021

(54) METHOD FOR MANUFACTURING A COMPOSITE MATERIAL PART COMPRISING A BODY EXTENDED BY A REINFORCED ATTACHMENT END

(71) Applicant: SAFRAN, Paris (FR)

(72) Inventors: Nicolas Pierre Lanfant, Moissy-Cramayel (FR); Dominique Marie Christian Coupe, Moissy-Cramayel (FR); Pierre Faivre D'Arcier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 227 days.

(21) Appl. No.: 16/603,643

(22) PCT Filed: Apr. 9, 2018

(86) PCT No.: PCT/FR2018/050885
§ 371 (c)(1),
(2) Date: Oct. 8, 2019

(87) PCT Pub. No.: WO2018/189470
PCT Pub. Date: Oct. 18, 2018

(65) Prior Publication Data
US 2020/0108569 A1    Apr. 9, 2020

(30) Foreign Application Priority Data
Apr. 13, 2017  (FR) ...................... 17 53243

(51) Int. Cl.
*B29C 70/22*    (2006.01)
*F01D 5/28*    (2006.01)
(Continued)

(52) U.S. Cl.
CPC .............. *B29C 70/48* (2013.01); *B29C 70/24* (2013.01); *B29C 70/543* (2013.01);
(Continued)

(58) Field of Classification Search
CPC ..... B29C 70/48; B29C 70/545; B29C 70/543; B29C 70/24; B29D 99/0025; C04B 35/622; C04B 35/80
See application file for complete search history.

(56) References Cited

U.S. PATENT DOCUMENTS

| 2018/0319044 A1 | 11/2018 | Lanfant et al. |
| 2019/0202090 A1 | 7/2019 | Lanfant et al. |

FOREIGN PATENT DOCUMENTS

| DE | 29 27 653 A1 | 1/1981 |
| WO | 2013079860 A1 | 6/2013 |

OTHER PUBLICATIONS

Search Report issued in French Patent Application No. 17 53243 dated Jan. 17, 2018.
(Continued)

*Primary Examiner* — Woody A Lee, Jr.
(74) *Attorney, Agent, or Firm* — Pearne & Gordon LLP

(57) ABSTRACT

The invention concerns a method for manufacturing a turbomachine flow straightener made from composite material having a blade extended by at least one attachment end, comprising the operations of:
  forming a fibrous blank from a three-dimensional fabric comprising warp threads oriented in a direction corresponding to the longitudinal direction of the blade to be manufactured;
  dividing at least one end of the fibrous blank by separating in order to constitute at least two sets of integrated layers;
  shifting at least one set of integrated layers in a planar configuration such that the warp threads are inclined in this set of integrated layers relative to the orientation of the warp threads in the fibrous blank portion of the blade.

12 Claims, 4 Drawing Sheets

FIG. 1

(51) Int. Cl.
  *B29C 70/48*    (2006.01)
  *B29C 70/24*    (2006.01)
  *B29D 99/00*    (2010.01)
  *B29C 70/54*    (2006.01)
  *C04B 35/80*    (2006.01)
  *C04B 35/622*   (2006.01)
  *B29B 11/16*    (2006.01)
  *B29L 31/08*    (2006.01)
  *D03D 25/00*    (2006.01)

(52) U.S. Cl.
  CPC ........ *B29C 70/545* (2013.01); *B29D 99/0025* (2013.01); *C04B 35/622* (2013.01); *C04B 35/80* (2013.01); *B29B 11/16* (2013.01); *B29C 70/222* (2013.01); *B29L 2031/08* (2013.01); *D03D 25/005* (2013.01); *F01D 5/282* (2013.01); *F05D 2300/6033* (2013.01)

(56) References Cited

OTHER PUBLICATIONS

International Search Report issued in Application No. PCT/FR2018/050885 dated Jul. 9, 2018.
Written Opinion issued in Application No. PCT/FR2018/050885 dated Jul. 9, 2018.

METHOD FOR MANUFACTURING A COMPOSITE MATERIAL PART COMPRISING A BODY EXTENDED BY A REINFORCED ATTACHMENT END

This is the National Stage application of PCT international application PCT/FR2018/050885, filed on Apr. 9, 2018 entitled "METHOD FOR MANUFACTURING A COMPOSITE MATERIAL PART COMPRISING A BODY EXTENDED BY A REINFORCED ATTACHMENT END", which claims the priority of French Patent Application No. 17 53243 filed Apr. 13, 2017, both of which are incorporated herein by reference in their entirety.

TECHNICAL FIELD

The invention concerns a method for manufacturing a composite material part comprising a body extended by a reinforced attachment end including a hole having increased mechanical strength.

PRIOR ART

The invention notably applies to the manufacture of a turbomachine flow straightener made from composite material, the ends of which are coupled to the structural elements of the engine, by attachment screws, being subjected to significant shear forces.

In general, a turbofan comprises a sleeve wherein the air is sucked in by the blades of a fan before being divided into a primary air flow and a secondary air flow that surrounds same. The primary air flow circulates in a primary flow path extending between the rotor elements of the engine and an intermediate envelope that surrounds same. The secondary air flow circulates in a secondary flow path that extends between the intermediate envelope and an outer envelope or by-pass duct of the engine.

The primary air flow passes through a compressor located after the fan whereas the secondary air flow is ejected rearwards in order to directly generate a thrust. After having been compressed, the primary air flow reaches a combustion chamber before being held in a high-pressure turbine then in a low-pressure turbine in order to drive the compression stages and the fan, before being expelled rearwards.

Such an engine comprises, downstream of the fan, a stage of secondary flow straighteners, usually designated by the acronyms, OGV meaning Outlet Guide Vane or SGV meaning Structural Guide Vane. The straighteners are oriented radially and evenly distributed about a longitudinal axis of rotation of the engine. Each straightener comprises an aerodynamic portion known as blade extended by two coupling ends in the form of platforms, for attaching the straightener to the intermediate envelope on the one hand and to the fan casing that delimits the outer envelope on the other hand.

In the event of loss of a fan blade, the fan casing deforms significantly, which subjects the straighteners to high mechanical stresses and loads relative to the working stresses. In practice, the high stresses sustained by the ends may lead to the pull-out of the attachment holes.

The aim of the invention is to provide a solution to the reinforcement of a coupling end of a composite material part, said end being able to be intended for receiving attachment screws as in the case of a flow straightener or even a shaft as in the case of a landing gear strut having a coupling end in the shape of a yoke.

DESCRIPTION OF THE INVENTION

To this end, the aim of the invention is a method for manufacturing a composite material part comprising a body extended by a reinforced coupling end, including the operations of:
  forming a fibrous blank from a three-dimensional fabric comprising warp threads oriented in a main direction with separation of at least one end of the fibrous blank in order to constitute at least two sets of integrated layers;
  shifting at least one set of integrated layers in a planar configuration by offsetting one end edge of said set of integrated layers by applying to said end edge a shear displacement oriented parallel to the set of integrated layers and perpendicular to the main direction, in order to incline the warp threads of said set of integrated layers relative to the main direction;
  shaping of the fibrous blank in order to constitute a preform;
  injection of a matrix into the preform.

With said solution, the end is reinforced in relation to the shear stresses thanks to the different inclination that is given to the warp fibres in the end. This makes it possible to increase the pull-out strength of the hole or holes of the coupling end, that is to say to reduce the risk of shear failure.

The invention also concerns a method thus defined, wherein the separation of the fibrous blank is carried out during an operation for weaving the three-dimensional fabric according to a separation plane parallel to the main direction by arranging a routing of the weft threads without crossing the separation plane in the reinforced end.

The invention also concerns a method thus defined, wherein after the shifting operation, the warp threads are inclined by an angular value between +45 degrees and −45 degrees relative to the main direction.

The invention also concerns a method thus defined, including the application of a means of attachment such as a film of glue to a portion of each shifted set of integrated layers in order to hold same in shifted configuration.

The invention also concerns a method thus defined, including the addition of threads of fibreglass, carbon or Kevlar by sewing in the transverse direction or by stitching to a plurality of shifted sets of integrated layers in order to hold same together.

The invention also concerns a method thus defined, wherein the coupling end comprises a proportion of weft threads relative to the warp threads that is different from the proportion of weft threads relative to the warp threads in the body.

The invention also concerns a method thus defined, wherein the weft threads have in the reinforced end a section smaller than the section of the weft threads in the body.

The invention also concerns a method thus defined, applied to the manufacture of a turbomachine flow straightener made from composite material including a body forming a blade extended by at least one coupling end, wherein the main direction corresponds to the direction of the body.

The invention also concerns a method thus defined, wherein the end is separated into a plurality of sets of integrated layers, and wherein said sets of integrated layers are shifted in a balanced manner so that the sum of the angles of the warp threads of each set of integrated layers relative to a plane parallel to the main direction and normal to said sets of integrated layers is zero.

The invention also concerns a method thus defined, wherein the end is separated into a plurality of sets of integrated layers and wherein said sets of integrated layers are shifted symmetrically in order to comprise a plane of symmetry for which each pair of sets of integrated layers located on either side of and at same distance from said plane of symmetry comprises warp threads having the same inclination relative to a plane parallel to the main direction and normal to said sets of integrated layers.

The invention also concerns a method thus defined, wherein the end of the fibrous blank is separated into a central set of integrated layers, an upper set of integrated layers and a lower set of integrated layers, wherein the upper set of integrated layers and the lower set of integrated layers are shifted so that the warp threads of said shifted sets of integrated layers are inclined by opposite angles relative to a plane that is normal to the central set of integrated layers and parallel to the warp threads of the central set of integrated layers.

The invention also concerns a method thus defined, wherein the separated sets of integrated layers are folded relative to the remainder of the fibrous blank in order to constitute a coupling end of the straightener, before injection of the matrix.

DETAILED DESCRIPTION OF SPECIFIC EMBODIMENTS

Figure 1:
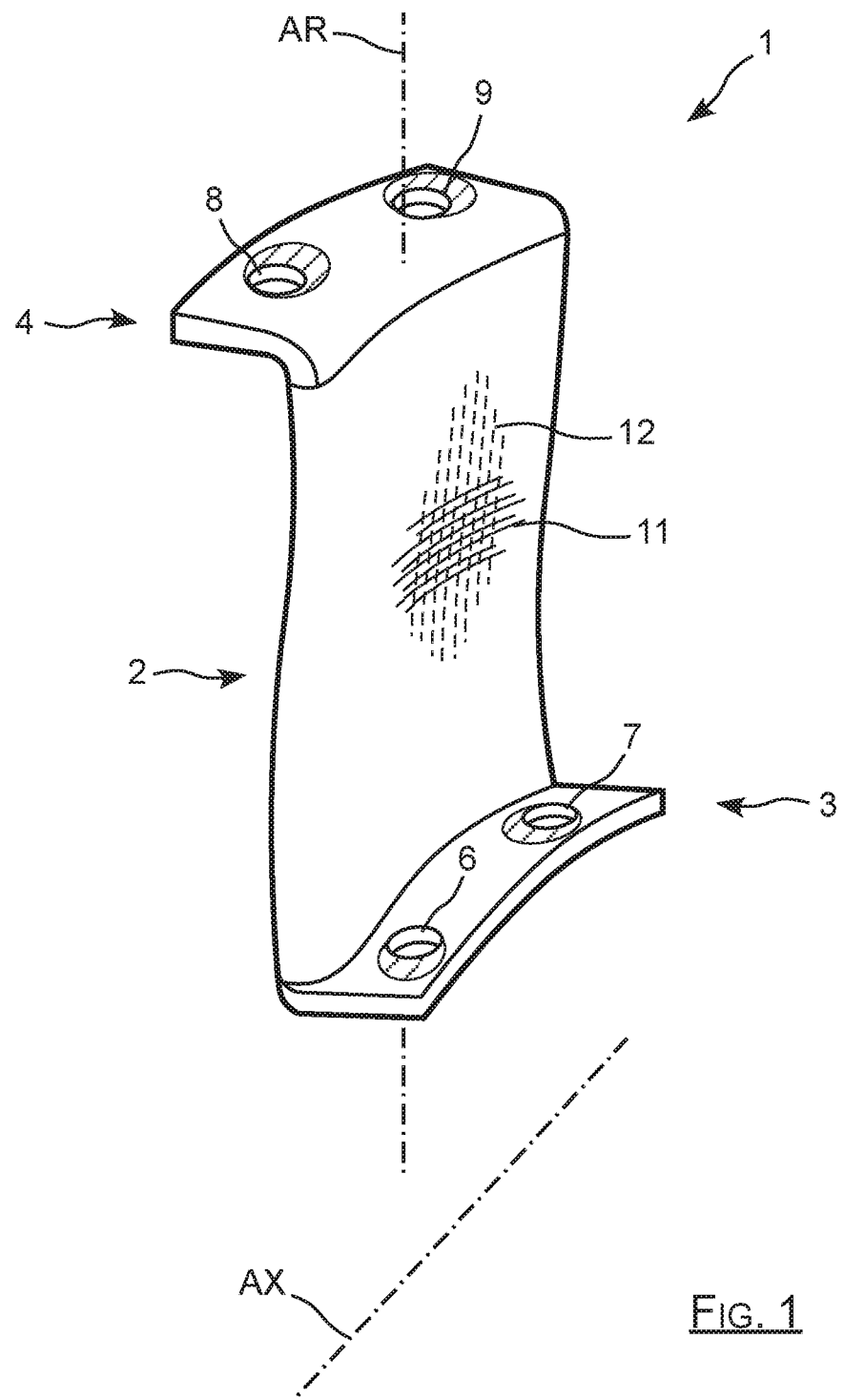
FIG. 1 is a perspective overview of a straightener located downstream of a fan.

As seen in FIG. 1, a secondary flow straightener 1, intended to be located downstream of the fan, comprises a blade 2, extended by a first and a second coupling end marked 3 and 4. Said blade 2 has a substantially curved shape with rectangular contour, and the coupling ends 3 and 4 that extend same have shapes of attachment lugs constituting the platforms oriented perpendicular to the blade 2.

The blade 2 extends according to a main direction AR corresponding to a radial direction relative to a direction AX corresponding to a longitudinal axis of a turbofan that same is intended to equip.

The first platform 3 comprises here two through-holes 6 and 7, for attaching the straightener to an element of the intermediate envelope of the engine by means of two screws or bolts. Similarly, the second platform 4 also comprises two through-holes 8 and 9 for attaching the straightener 1 to the fan casing of the engine by means of two other screws or bolts.

Said straightener 1 is manufactured from a fibrous blank of three-dimensional fabric, notably expected that the three-dimensional fabric makes it possible to obtain a sufficient mechanical strength in relation to impacts, which correspond, for example, to hail ingested by the engine in operation, and hitting the blade 2.

The three-dimensional fabric is oriented in such a manner that the warp threads thereof, marked by 12 extend in the direction AR, and that the weft threads thereof, marked by 11, extend parallel to the direction AX. In such a three-dimensional fabric, the weft threads are woven to interlink the various layers of warp threads. Each layer of warp threads extends along a plane parallel to the axes AX and AR, and said layers are superimposed on one another in the direction of the thickness of the blade body, that is to say perpendicular to the axes AX and AR.

Each weft thread consists of portions each winding in a plane normal to the warp threads, in order to interlink the various layers with one another in order to form a thick fabric having its own consistency, that is to say all of the threads hold together.

Said dry fibrous blank is made of a three-dimensional fabric, for example, of carbon fibres, and same is shaped according to a plurality of preliminary operations before being installed in a mould or similar for carrying out with the injection of a matrix such as a matrix of organic or ceramic type. The rough part thus obtained is subsequently subjected to various additional machining and/or finishing operations in order to constitute the finished straightener, that is to say ready to be mounted in an engine.

Nevertheless, it is proven that in a three-dimensional fabric, the resistance to mechanical and shear stresses is relatively low.

In order to increase the mechanical shear strength of the platforms of the blade, each end of the fibrous blank of three-dimensional fabric, again known as preform, comprises a portion that is separated in order to constitute at least two sets of integrated layers, and said sets of integrated layers are shifted in a planar configuration relative to the blade in order to constitute the platform.

Figure 2:
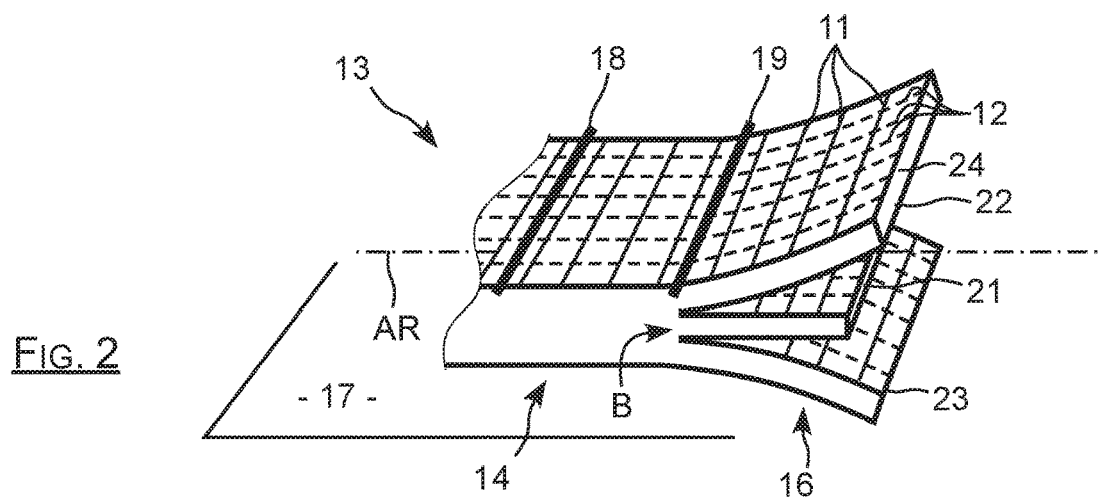
FIG. 2 is a perspective schematic view of the fibrous blank showing the separation of one end of said blank into three sets of integrated layers in accordance with the invention.

A fibrous blank 13 made of three-dimensional fabric shown in FIG. 2 comprises a body 14 intended to constitute the blade 2, and an end 16, intended to constitute one of the platforms or coupling end 3, 4 extending said blade 2.

Said fibrous blank 13 is installed and attached in a planar configuration on a support such as a work table 17, for example, by means of jaws or even clips 18, 19 that press the body 14 thereof firmly against the table 17. When said blank 13 is installed on the table 17, same has a globally parallelepiped shape, the warp threads 12 thereof all extending parallel to one another along the entire length of said blank, parallel to the axis AR. The weft threads 11 themselves extend along planes normal to the warp threads 12. In the example in FIGS. 2 to 4, the end is separated into three distinct sets of integrated layers, including a central set of integrated layers 21, an upper set of integrated layers 22 and a lower set of integrated layers 23. The separation is carried out during the weaving of the three-dimensional fabric according to a separation plane parallel to the main direction arranging the routing of the weft threads during the weaving so that same do not cross the separation plane in the area of separation corresponding to the end of the fibrous blank, as indicated in patent document WO2013079860.

The separation plane is oriented parallel to the planes of the layers of warp threads 12, that is to say parallel to the table 17 in the configuration in the figures. The sets of layers 21 and 22, and the sets of layers 22 and 23 are thus separated from one another.

Figure 3:
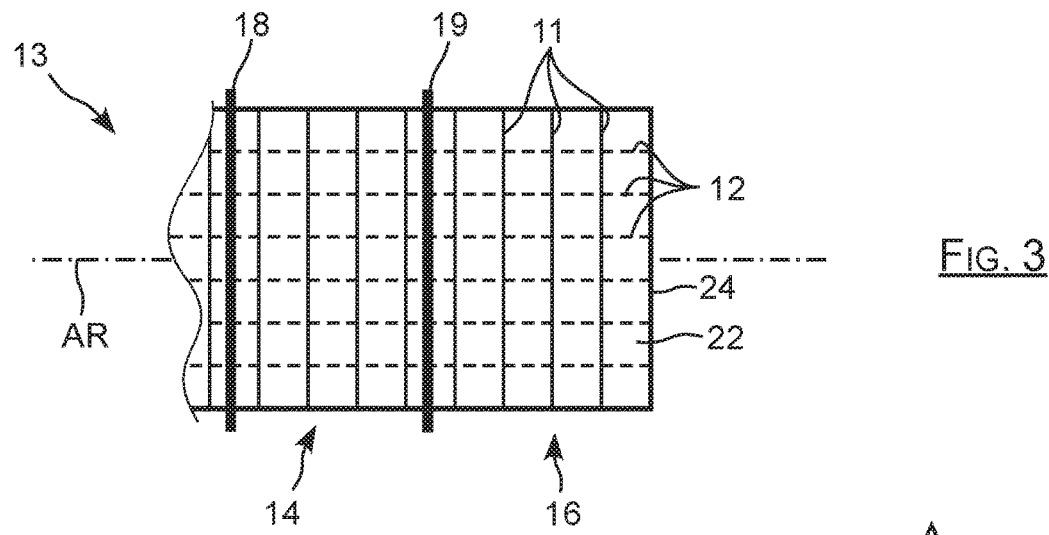
FIG. 3 is a top view showing the separated upper set of integrated layers in accordance with the invention.

When the sets of integrated layers have been separated, the situation of the fibrous blank corresponds to same illustrated in FIGS. 2 and 3. Each set of layers extends from the end edge thereof, up to the base B thereof that is situated in line with the clip 19 in the example in the figures, and which corresponds to the bottom of the separation of said sets of layers.

The end of the upper set of integrated layers 22 is subsequently shifted, as illustrated schematically in FIG. 4, so as to incline the warp fibres of said end 16 relative to the orientation thereof in the blank body 14.

Said shifting operation consists of grasping the end edge 24 of the set of layers 22, whereas the remainder of the preform blank is held in position by being pressed against the table 17 by the clips 18 and 19, and of moving same along a plane parallel to the set of integrated layers, and therefore parallel to the table in the example in the figures, in a direction D perpendicular to the axis AR. The displacement carried out thus corresponds to a shear type displacement of the end edge 24 of the upper set of layers 22 relative to the base B thereof, and same amounts to modifying the rectangular shape of the upper set of layers 22 into a parallelogram shape.

Figure 4:
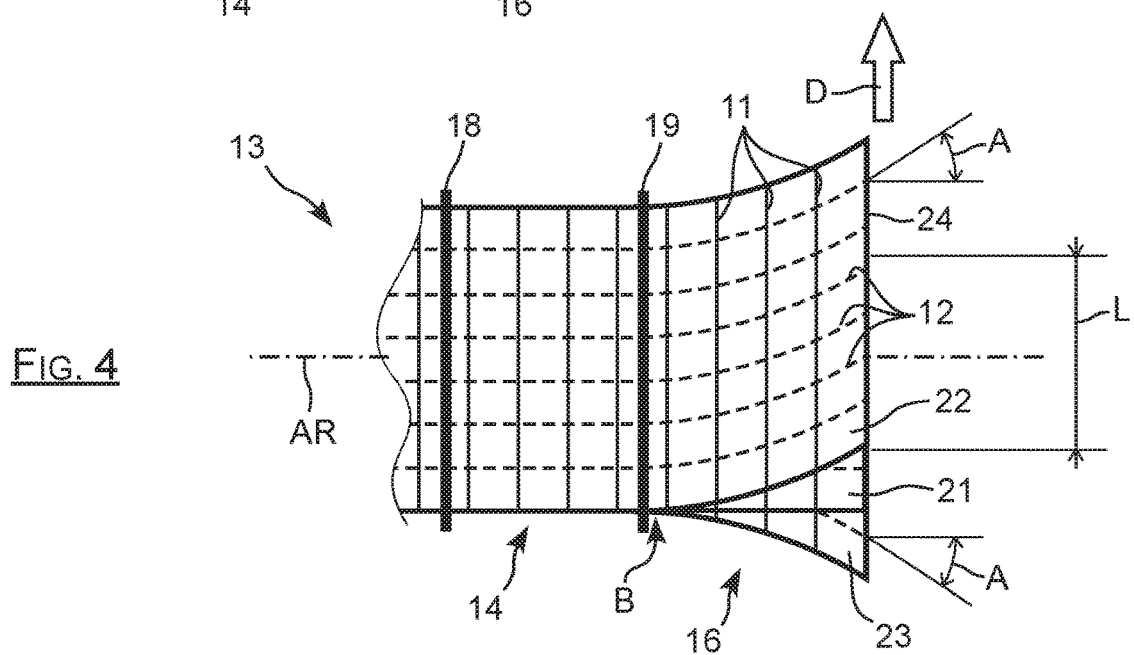
FIG. 4 is a top view of the upper set of integrated layers of fabric separated during the shifting operation of the end of said upper set of integrated layers in accordance with the invention.

As shown in FIG. 4, after said shifting operation, the warp threads 12 of the upper set of layers 22 are inclined relative to the axis AR by an angle noted A, whereas the weft threads 11 of said upper set of layers have remained substantially perpendicular to the direction AR. In the remainder of the fibrous blank, corresponding to the blade body 14, the warp threads have remained parallel to the main direction AR of the blade, and the weft threads 11 have also kept the initial orientation thereof, perpendicular to the axis AR.

Similarly, the lower set of integrated layers 23 is itself also shifted in a plane parallel to same of the table 17, but in a direction opposite to the direction D, so that the warp fibres thereof are also inclined by an angle A relative to the axis AR, but of opposite orientation. Thus, the angle formed by the warp threads of the upper set of layers 22 with the warp threads of the lower set of layers 23 is worth the double of the angle A.

The central set of layers 21 for its part is not shifted, the warp fibres thereof thus remaining parallel to the direction AR. The warp threads of the upper set of layers 22 and the warp threads of the lower set of layers 23 are thus inclined by opposite angles relative to a plane normal to the central set of layers 21 and oriented parallel to the warp threads of said central set of layers 21.

During the shifting operation, it is also possible to disorient the weft threads 11 by moving them away from the base B, along one and/or of the other of the lateral edges of the shifted set of layers. This may result in the shifting operation, when same is carried out by pulling the set of integrated layers parallel to the weft threads and to the clip 12, by exerting a displacement more closely resembling same of a rotation than a pure shear displacement.

In a more general manner, it is possible to modify the spacing of the weft threads along the axis AR at the end, in order to obtain in said end a proportion of weft threads relative to the warp threads that is different from the proportion of weft threads relative to the warp threads in the body of the part.

It is also possible to use in the reinforced end 16 weft threads 11 having a section smaller than same of the weft threads of the body 14, so as to reduce the undulation of the warp threads 12 in said end, said modification of section being implemented during the weaving.

When the upper and lower sets of layers 22 and 23 have been shifted, the situation of the fibrous blank corresponds to same in FIG. 4. In general, the invention makes it possible to treat the separated end as a conventional laminate including a greater number of sets of integrated layers than in the example in FIG. 4. In any case, the stacking is organised in order to be balanced, that is to say to comprise as many sets of layers the warp threads of which are inclined by the value +A relative to the direction AR as there are sets of layers the warp threads of which are inclined by the value −A relative to said direction AR.

The stacking is symmetrically advantageous, that is to say that same comprises a plane of symmetry, either side of which the stacking angles of the warp threads are identical: for two sets of integrated layers located on either side of and at same distance from said plane, the angle of the warp threads for said two symmetrical layers relative to the main direction is the same.

At this stage, a film of glue may be applied at the ends of the threads of the edges of the shifted sets of layers to ensure that said sets of layers remain in their shifted state instead of reverting back to the initial state thereof. Said film of glue is preferably applied in the areas of the fibrous blank corresponding to the portions that are subsequently removed by machining of the rough blade.

Said holding may also be carried out using additional threads added by sewing or stitching in transverse direction, that is to say crossing the sets of integrated layers. Said additional threads may be threads of fibreglass, carbon or Kevlar mainly ensuring the holding of the threads of the fibrous blank. Said holding may also be carried out by any other suitable method.

As seen in FIG. 4, at this stage, the effective width of the fibrous blank, noted L, that is to say the width over which same comprises the three sets of integrated layers in the direction of the thickness thereof, has become smaller than the initial width thereof. This is due to the fact that the shifting has moved one of the lateral edges of the upper set of layers of the axis AX closer, and likewise for the lower set of layers.

Figure 5:
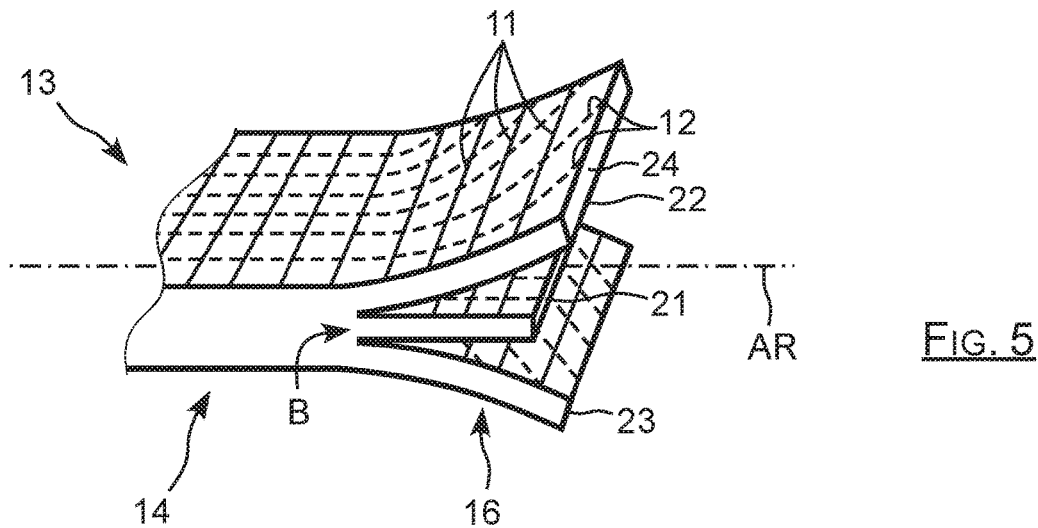
FIG. 5 is a perspective view of the fibrous blank of which the end of the upper set of integrated layers and of the lower set of integrated layers have been shifted in accordance with the invention.
Figure 6:
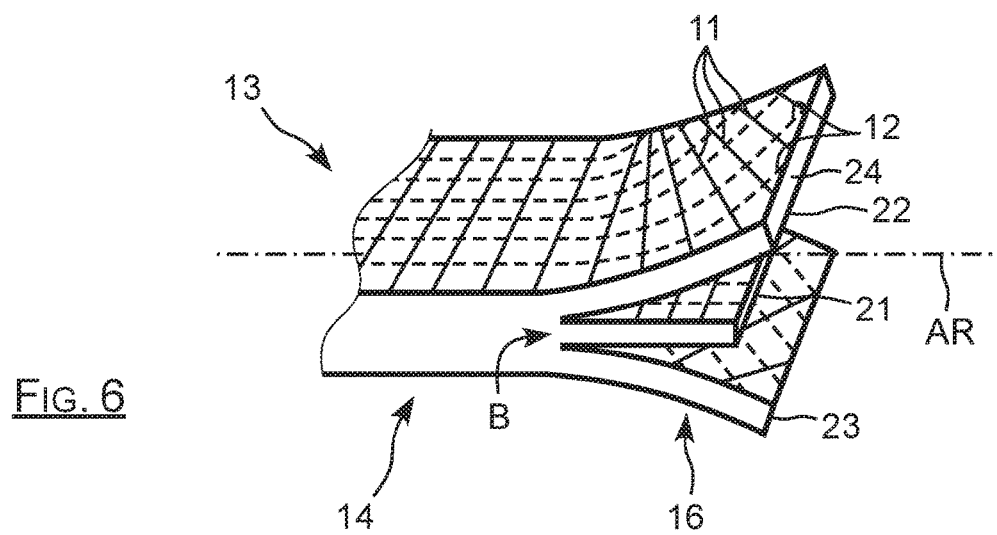
FIG. 6 is a perspective view of the fibrous blank of which the end of the upper set of integrated layers and of the lower set of integrated layers have been shifted in accordance with an alternative of the invention.

If applicable, the fibrous blank may therefore be cut along the two longitudinal edges thereof parallel to the direction AR, in order to have a constant thickness along the length thereof and in particular at the ends thereof. The blank of fibre of constant effective width, and the sets of integrated layers of which have been glued or held consistent by another means, is presented therefore as illustrated in FIG. 5.

At this stage, the three sets of layers are joined to one another in order to be folded together perpendicular to the plane of the table, such as to adopt a shape corresponding approximately to same of the platform or end 3 or 4 of the straightener. Other additional operations may therefore be carried out in order to constitute, from said fibrous blank, a preform ready to be installed in a corresponding injection installation in view of carrying out the injection of the matrix for interlinking the threads of the fibrous blank in order to constitute the straightener.

The straightener thus obtained has a portion corresponding to the blade that is made of three-dimensional fabric not separated, and a separated portion corresponding to the coupling ends thereof that is a stacking of sets of layers of fabric having different orientations.

Thus, the blade has the mechanical characteristics specific to the three-dimensional fabric notably offering significant resistance to impacts, and the attachment ends have other mechanical characteristics such as in particular a better shear strength.

Figure 7:
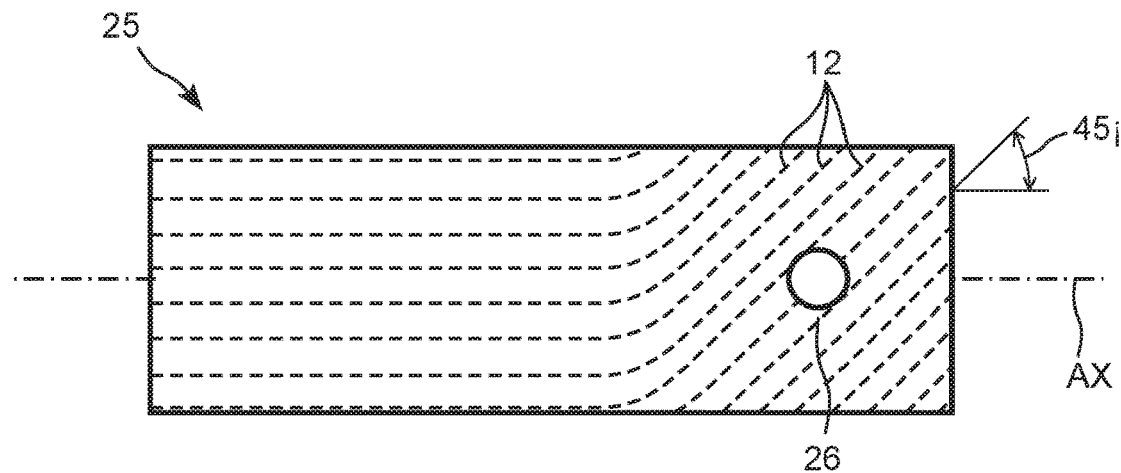
FIG. 7 is a top view showing the orientation of the warp threads in the body and in the end of a test specimen according to the invention.

Moreover, a calculation by finite elements based on a test specimen 25 shown in FIG. 7 and corresponding to the fibrous blank in FIG. 5 the sets of integrated layers of which have been joined before injection of the matrix, shows that the invention makes it possible to reduce the concentration of stresses in the event of shear stress.

Said model of test specimen 25 comprises at the attachment end thereof an upper set of integrated layers shifted to 45 degrees and a lower set of integrated layers shifted to −45 degrees, with an attachment hole 26 crossing said coupling end. The digital simulation thereof in relation to shear stress when the hole 26 is locked in position and when the shear type forces, that is to say perpendicular to the axis AR, are applied to the body show a reduction of the concentration of stress.

Figure 8:
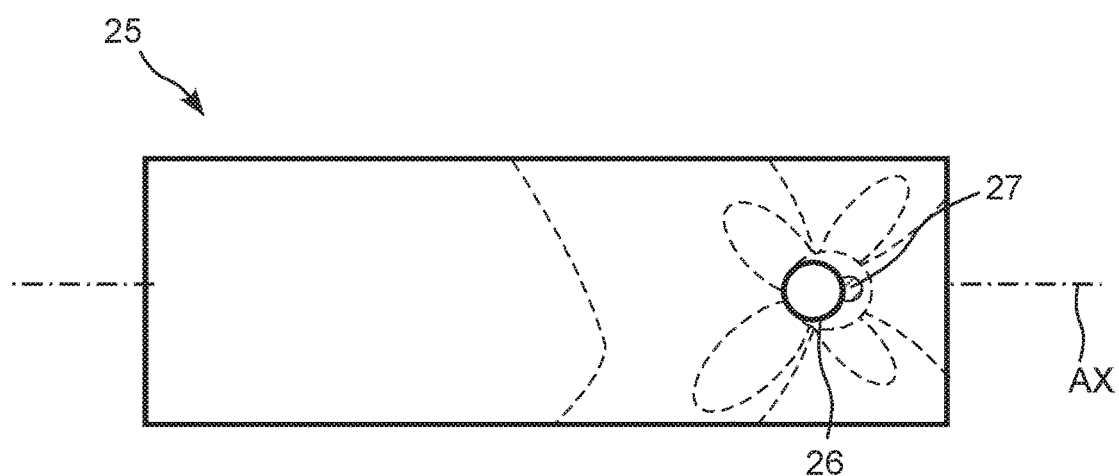
FIG. 8 is a top view illustrating the distribution of stresses in the event of shear stress in the test specimen according to the invention.
Figure 9:
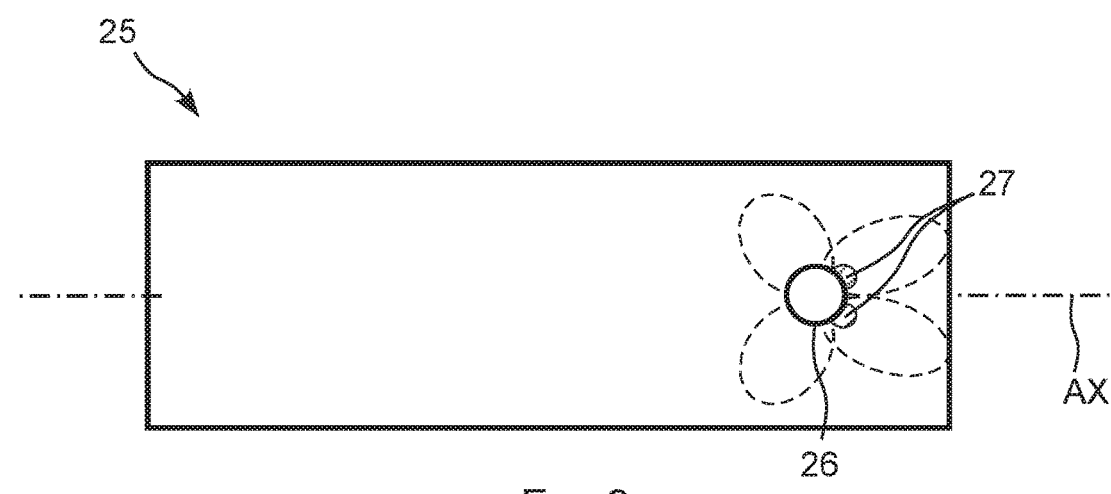
FIG. 9 is a top view showing the distribution of stresses in the event of shear stress in the test specimen according to prior art.

Indeed, a comparison of FIGS. 8 and 9 showing the distribution of the stresses in a test specimen according to the invention and a test specimen according to prior art, that is to say entirely made of three-dimensional fabric, highlights that there are fewer areas of stress concentration, marked by 27 in FIG. 8 than in FIG. 9. In concrete terms, the maximum shear stress in the case of FIG. 8 is 20% less than the maximum shear stress in the case of FIG. 9.

Moreover, other digital simulations show that the stiffness, that is to say the tensile strength of the test specimen according to the invention is not reduced relative to same of a test specimen of prior art, whereas the mechanical strength is increased by approximately 20%.

In the examples in the figures, the invention is implemented with a straightener having attachment ends extending into platforms on one side of the blade relative to the axis thereof. However, it is also possible to apply same to attachments of other forms, such as for example, the straightener disclosed in patent document WO 2013/079860.

Moreover, the invention covers in general an arrangement including a separation into any number of sets of integrated layers at the reinforced end, without being limited to two or three sets of integrated layers.

In general, the invention makes it possible to manufacture a part from a three-dimensional fabric with one or more separations used to improve the shear strength of the attachment ends of said part.

In the example in the figures, the invention is applied to a flow straightener, but it applies to other types of parts including a coupling end integrating a hole, such as a yoke, for which it is desired to increase the pull-out strength of said hole, that is to say the mechanical strength to the shear forces in the vicinity of the hole. Thus, the invention notably applies to the mechanical reinforcement of a landing gear strut yoke of the type described notably in patent documents FR2893532 or FR2953160.

It should be noted that in the example described, the fibrous blank consists of threads. Said threads that are typically made of carbon may be presented in said blank in the form of single threads or even in the form of strands.

What is claimed is:

1. Method for manufacturing an aircraft composite material part comprising a body (14) extended by a reinforced coupling end (16), comprising the operations of:
    forming a fibrous blank (13) from a three-dimensional fabric comprising warp threads (12) oriented in a main direction (AR) with separation of at least one end (16) of the fibrous blank (13) in order to constitute at least two sets of integrated layers (21, 22, 23);
    shifting at least one set of integrated layers (22, 23) in a planar configuration by offsetting one end edge (24) of said set of integrated layers (22, 23) by applying to said end edge (24) a shear displacement oriented parallel to the set of integrated layers (22, 23) and perpendicular to the main direction (AR), in order to incline the warp threads (12) of said set of integrated layers (22, 23) relative to the main direction (AR);
    shaping of the fibrous blank in order to constitute a preform;
    injection of a matrix into the preform.

2. Method according to claim 1, wherein the separation of the fibrous blank is carried out during an operation for weaving the three-dimensional fabric according to a separation plane parallel to the main direction (AR) by arranging a routing of the weft threads (11) without crossing the separation plane in the reinforced end (16).

3. Method according to claim 1, wherein after the shifting operation, the warp threads are inclined by an angular value between +45 degrees and −45 degrees relative to the main direction (AR).

4. Method according to claim 1, including the application of a means of attachment to a portion of each shifted set of integrated layers in order to hold same in shifted configuration.

5. Method according to claim 1, including the addition of threads of fibreglass, carbon or Kevlar by sewing or by cross stitching a plurality of shifted sets of integrated layers in order to hold same together.

6. Method according to claim 1, wherein the coupling end comprises a proportion of weft threads (11) relative to the warp threads (12) that is different from the proportion of weft threads (11) relative to the warp threads (12) in the body (14).

7. Method according to claim 1, wherein the weft threads (11) have in the reinforced end (16) a section smaller than the section of the weft threads (11) in the body (14).

8. Method according to claim 1 for manufacturing a turbomachine flow straightener (1) made from composite material including a body forming a blade (2) extended by at least one attachment coupling end (3, 4), wherein the main direction (AR) corresponds to the direction of the body.

9. Method according to claim 8, wherein the end (16) is separated into a central set of integrated layers (21), an upper set of integrated layers (22) and a lower set of integrated layers (23), wherein the upper set of integrated layers (22) and the lower set of integrated layers (23) are shifted so that the warp threads (12) of said shifted sets of integrated layers (22, 23) are inclined by opposite angles relative to a plane that is normal to the central set of integrated layers (21) and parallel to the warp threads of the central set of integrated layers (21).

10. Method according to claim 1, wherein the end (16) is separated into a plurality of sets of integrated layers (21, 22, 23), and wherein said sets of integrated layers (21, 22, 23) are shifted in a balanced manner so that the sum of the angles of the warp threads (12) of each set of integrated layers (21, 22, 23) relative to a plane parallel to the main direction (AR) and normal to said sets of integrated layers is zero.

11. Method according to claim 10, wherein the separated sets of integrated layers (21, 22, 23) are folded relative to the remainder of the fibrous blank (13) in order to constitute a coupling end of the straightener (1), before injection of the matrix.

12. Method according to claim 1, wherein the end (16) is separated into a plurality of sets of integrated layers and wherein said sets of integrated layers are shifted symmetrically in order to comprise a plane of symmetry for which each pair of sets of integrated layers located on either side and at same distance from said plane of symmetry comprises warp threads (12) having the same inclination relative to a plane parallel to the main direction (AR) and normal to said sets of integrated layers.

\* \* \* \* \*